United States Patent
Yeom

(10) Patent No.: US 11,114,703 B2
(45) Date of Patent: Sep. 7, 2021

(54) BATTERY PACK

(71) Applicant: SAMSUNG SDI CO., LTD., Yongin-si (KR)

(72) Inventor: Gilchoun Yeom, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 107 days.

(21) Appl. No.: 16/320,787

(22) PCT Filed: Jun. 28, 2017

(86) PCT No.: PCT/KR2017/006840
§ 371 (c)(1),
(2) Date: Jan. 25, 2019

(87) PCT Pub. No.: WO2018/030636
PCT Pub. Date: Feb. 15, 2018

(65) Prior Publication Data
US 2020/0185784 A1    Jun. 11, 2020

(30) Foreign Application Priority Data

Aug. 11, 2016    (KR) .......................... 10-2016-0102437

(51) Int. Cl.
*H01M 10/42* (2006.01)
*H01M 10/44* (2006.01)
*H02J 7/00* (2006.01)

(52) U.S. Cl.
CPC ......... *H01M 10/425* (2013.01); *H01M 10/44* (2013.01); *H02J 7/0031* (2013.01); *H01M 2010/4271* (2013.01)

(58) Field of Classification Search
CPC .... H01M 10/425; H01M 10/44; H01M 10/42; H01M 2/10; H01M 2010/4271;
(Continued)

(56) References Cited

U.S. PATENT DOCUMENTS 8,004,238 B2    8/2011    Kim et al.
8,138,721 B2    3/2012    Yang et al.
(Continued)

FOREIGN PATENT DOCUMENTS

KR    10-2009-0123821 A    12/2009
KR    10-2009-0126099 A    12/2009
(Continued)

OTHER PUBLICATIONS

Extended European Search Report issued by the European Patent Office dated Jan. 2, 2020 in the examination of the European Patent Application No. 17839654.5, which corresponds to above U.S. Application.

(Continued)

*Primary Examiner* — Ula C Ruddock
*Assistant Examiner* — Matthew W Van Oudenaren
(74) *Attorney, Agent, or Firm* — Lee IP Law, PC

(57) ABSTRACT

A battery pack according to various embodiments is provided. The battery pack includes: a battery including a plurality of battery cells; a first pack terminal and a second pack terminal, each connected to a charger; a cut-off switch arranged on a path through which charge and discharge currents of the battery flow; and a battery manager which monitors a state of the battery, turns off the cut-off switch when there is a risk of the battery being damaged, and determines whether the charger is a dedicated charger, wherein, when the charger is different from the dedicated charger, the battery manager turns off the cut-off switch when a pack voltage that is a voltage between the first pack terminal and the second pack terminal reaches a first reference voltage.

7 Claims, 6 Drawing Sheets

(58) Field of Classification Search
CPC .... H01M 10/46; H01M 10/63; H01M 10/633; H02J 7/0031; H02J 7/00047; H02J 7/0029; H02J 7/00308; H02J 7/00036
See application file for complete search history.

(56) References Cited

U.S. PATENT DOCUMENTS

| | | | |
|---|---|---|---|
| 8,633,677 | B2 | 1/2014 | Kim |
| 9,484,763 | B2 | 11/2016 | Kim et al. |
| 9,627,920 | B2 | 4/2017 | Yun |
| 9,917,451 | B2 | 3/2018 | Kim |
| 2011/0171506 | A1* | 7/2011 | Nozawa ............ H01M 10/482 429/91 |
| 2012/0119765 | A1* | 5/2012 | Bracker ............ H01M 10/42 324/750.01 |
| 2016/0156205 | A1 | 6/2016 | Lee |
| 2016/0226275 | A1 | 8/2016 | Kim et al. |

FOREIGN PATENT DOCUMENTS

| | | |
|---|---|---|
| KR | 10-2011-0054965 A | 5/2011 |
| KR | 10-2011-0075364 A | 7/2011 |
| KR | 2012-0054228 A | 5/2012 |
| KR | 2014-0048737 A | 4/2014 |
| KR | 10-2014-0094349 A | 7/2014 |
| KR | 10-2015-0106695 A | 9/2015 |
| KR | 10-2016-0094225 A | 8/2016 |

OTHER PUBLICATIONS

Korean Office action dated Aug. 24, 2020.
International Search Report dated Nov. 10, 2017 for PCT/KR2017/006840 filed Jun. 28, 2017.

* cited by examiner

BATTERY PACK

CROSS REFERENCE TO RELATED APPLICATIONS

This is the U.S. national phase application based on PCT Application No. PCT/KR2017/006840, filed Jun. 28, 2017, which is based on Korean Patent Application No. 10-2016-0102437, filed Aug. 11, 2016, the entire contents of all of which are hereby incorporated by reference.

TECHNICAL FIELD

Embodiments of the present disclosure relate to a battery pack.

BACKGROUND ART

A secondary battery (secondary cell) refers to a battery that is capable of converting chemical energy into electrical energy and outputting the electrical energy and is conversely capable of receiving electrical energy and storing the electrical energy in the form of chemical energy, that is, a battery that may repeatedly alternate between charging and discharging. Secondary batteries are used to provide driving power not only in portable electronic devices such as mobile phones, digital cameras, and notebook computers, but also in automobiles, motorcycles, and the like.

There are various types of secondary batteries, such as nickel-cadmium batteries, nickel metal hydride (NiMH) batteries, lithium-ion batteries, lithium polymer batteries, and lead storage batteries. Each secondary battery may have a different full-charge voltage while having the same rated voltage. A charger terminates charging based on the full-charge voltage of a battery to be charged. When a secondary battery of the related art is replaced with another type of secondary battery, there is a risk of overcharging or the like when a dedicated charger for the secondary battery of the related art is used as is.

DESCRIPTION OF EMBODIMENTS

Technical Problem

Provided is a battery pack including a secondary battery that may be used without replacing a charger or a charge system of the related art even when a secondary battery of the related art is replaced with another type of secondary battery.

Solution to Problem

According to an aspect of the present disclosure, a battery pack includes: a battery including a plurality of battery cells; a first pack terminal and a second pack terminal connected to a charger; a cut-off switch arranged on a path through which charge and discharge currents of the battery flow; and a battery manager which monitors a state of the battery, turns off the cut-off switch when there is a risk of the battery being damaged, and determines whether the charger is a dedicated charger, wherein, when the charger is different from the dedicated charger, the battery manager turns off the cut-off switch when a pack voltage that is a voltage between the first pack terminal and the second pack terminal reaches a first reference voltage.

According to an example, when the charger is determined as the dedicated charger, the battery manager may maintain a turn-on state of the cut-off switch when the voltage between the first pack terminal and the second pack terminal reaches the first reference voltage.

According to another example, the battery pack may further include a setting unit which outputs a signal by which the battery manager determines a type of the charger.

According to another example, the setting unit may output any one of a first signal and a second signal to the battery manager, the battery manager may determine, when receiving the first signal, that the charger is different from the dedicated charger, and the battery manager may determine, when receiving the second signal, that the charger corresponds to the dedicated charger.

According to another example, the battery pack may further include a communicator electrically connected to the charger to transmit the state of the battery, wherein, when the communicator is not electrically connected to the charger, the battery manager may determine that the charger is different from the dedicated charger.

According to another example, when the cut-off switch is turned off, the battery manager may monitor the voltage between the first pack terminal and the second pack terminal.

According to another example, when the voltage between the first pack terminal and the second pack terminal is lower than or equal to a second reference voltage that is lower than the first reference voltage, the battery manager may turn on the cut-off switch.

According to another example, the battery manager may estimate a degradation degree of the battery according to a charge count of the battery and change a level of the first reference voltage according to the degradation degree.

According to another example, the cut-off switch may include a relay.

Advantageous Effects of Disclosure

According to various embodiments of the present disclosure, even when a secondary battery of the related art is replaced with another type of secondary battery, by determining the charge mode of a battery pack, a charger or a charge system for the other type of secondary battery may be used as is.

MODE OF DISCLOSURE

Figure 1:
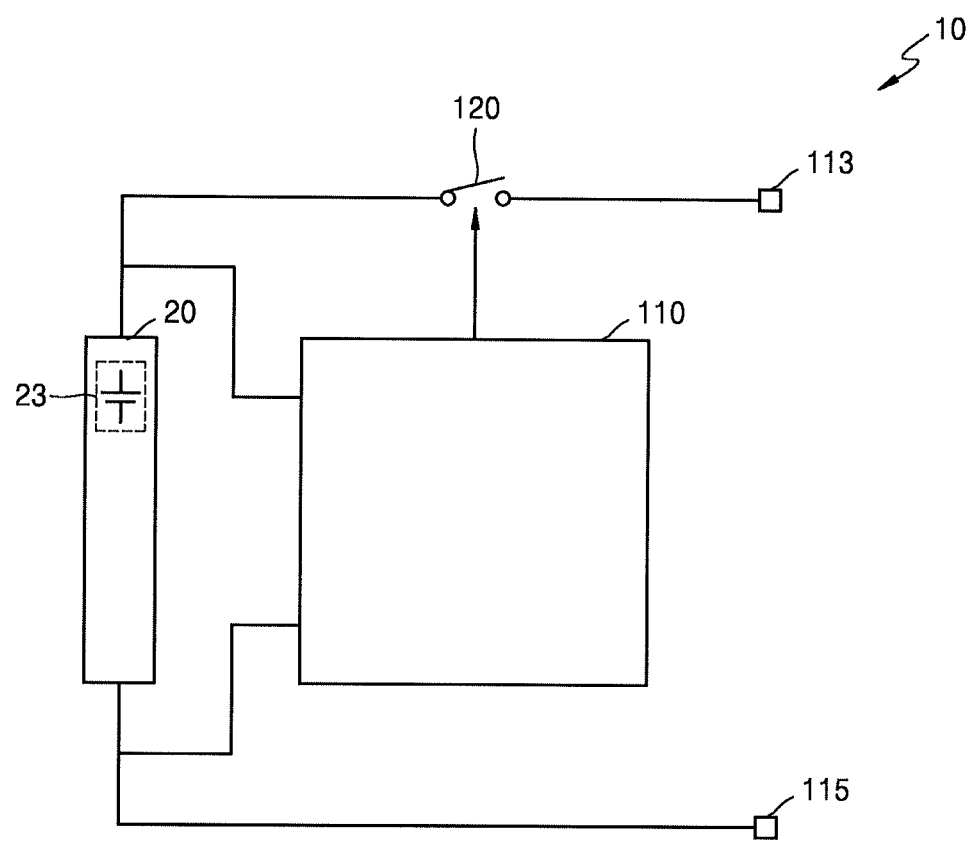
FIG. 1 briefly illustrates the internal configuration of a battery pack according to an embodiment.

The accompanying drawings for illustrating embodiments of the present disclosure are referred to in order to gain a sufficient understanding of the present disclosure, the merits thereof, and the objectives accomplished by the implementation of the present disclosure. However, it should be understood that the present disclosure is not limited to the embodiments described below but may be embodied in various different forms and may include all modifications, equivalents, and alternatives falling within the spirit and scope of the present disclosure. The embodiments described below are provided so that the present disclosure will be thorough and complete and will fully convey the scope of the present disclosure to those of ordinary skill in the art. In the following description of the present disclosure, certain detailed descriptions of the related art will be omitted when it is deemed that they may unnecessarily obscure the subject matters of the present disclosure.

For example, particular shapes, structures, and features described herein may be modified from some embodiments to other embodiments without departing from the spirit and scope of the present disclosure. Also, it will be understood that the position or arrangement of individual components in each embodiment may be modified without departing from the spirit and scope of the present disclosure. Thus, the following detailed description should be considered in a descriptive sense only and not for purposes of limitation, and the scope of the present disclosure should be construed as including the appended claims and all equivalents thereof. In the drawings, like reference numerals will denote like elements throughout various aspects. That is, particular details described herein are merely examples. Particular embodiments may vary from these example details and may still be contemplated within the spirit and scope of the present disclosure.

Although terms such as "first" and "second" may be used herein to describe various elements or components, these elements or components should not be limited by these terms. These terms are only used to distinguish one element or component from another element or component.

The terminology used herein is for the purpose of describing particular embodiments only and is not intended to limit the present disclosure. As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof. Although terms such as "first" and "second" may be used herein to describe various elements or components, these elements or components should not be limited by these terms. These terms are only used to distinguish one element or component from another element or component.

Hereinafter, embodiments of the present disclosure will be described in detail with reference to the accompanying drawings. In the following description, like reference numerals will be used to denote like elements, and redundant descriptions thereof will be omitted for conciseness.

FIG. 1 briefly illustrates the internal configuration of a battery pack according to an embodiment.

Referring to FIG. 1, a battery pack 10 may include a battery 20, a cut-off switch 120, a first pack terminal 113, a second pack terminal 115, and a battery manager 110.

The battery 20 may store electric power and may include at least one battery cell 23. One battery cell 23 may be included in the battery 20 or a plurality of battery cells 23 may be included in the battery 20. The battery cells 23 may be connected in series, in parallel, or in series-parallel. The number of battery cells 23 included in the battery 20 and the connection method thereof may be determined according to the required output voltage and power storage capacity.

The battery cell 23 may include a secondary battery other than a rechargeable lead storage battery. For example, the battery cell 23 may include a nickel-cadmium battery, a nickel metal hydride battery (NIMH), a lithium ion battery, or a lithium polymer battery.

The first pack terminal 113 and the second pack terminal 115 may be electrically connected to an external device. For example, the first and second pack terminals 113 and 115 may be line patterns such as electrodes, connectors, terminal blocks, lands, or pads. The battery 20 may supply a current or voltage to an external device such as a load device through the first pack terminal 113 or the second pack terminal 115, or an external device such as a charge device may supply a charge current to the battery 20 through the first pack terminal 113 or the second pack terminal 115.

The battery manager 110 may control the cut-off switch 120 to protect the battery 20. The battery manager 110 may control the flow of a current flowing into or out of the battery 20 by using the cut-off switch 120. For example, the battery manager 110 may perform an overcharge protection function, an overdischarge protection function, an overcurrent protection function, an overvoltage protection function, an overheat protection function, a cell balancing function, and the like.

The battery manager 110 may obtain the current, the voltage, the temperature, the remaining power amount, the lifetime, the state of charge (SOC), and the like of the battery 20. For example, the battery manager 110 may measure the cell voltage and temperature of the battery cell 23 by using sensors. The battery manager 110 may monitor the voltage between the first pack terminal 113 and the second pack terminal 115.

When detecting that an abnormal condition such as overcharge, overdischarge, overcurrent, or high temperature has occurred in the battery 20, the battery manager 110 may open the cut-off switch 120 to protect the battery 20. The battery manager 110 may output a control signal for controlling the cut-off switch 120.

The cut-off switch 120 may be arranged between the battery 20 and any one of the first pack terminal 113 and the second pack terminal 115. Only the cut-off switch 120 may be arranged between the battery 20 and the first pack terminal 113 or between the battery 20 and the second pack terminal 115. The cut-off switch 120 may block a charge current and a discharge current when turned off according to the control signal of the battery manager 110.

According to an embodiment, the battery pack 10 may include a switch on a high-current path (a current path between the battery 20 and the first pack terminal 113 and the second pack terminal 115), and the switch may be the cut-off switch 120. The cut-off switch 120 may include one switch. When power is supplied to a motor such as an automobile or a motorcycle, the battery pack 10 may require a high output and a high discharge current may flow therethrough. In this case, when power is supplied to the motor or the like, the discharge current level may exceed a general allowable current level of a transistor and a diode. Therefore, when the cut-off switch 120 includes a transistor and a diode, there is a great risk that the transistor or the diode will be damaged by the high discharge current caused by the high output. Thus, the cut-off switch 120 may include a relay capable of stably operating even at the high discharge current and may simultaneously block the charge and discharge currents in a turn-off state.

Figure 2:
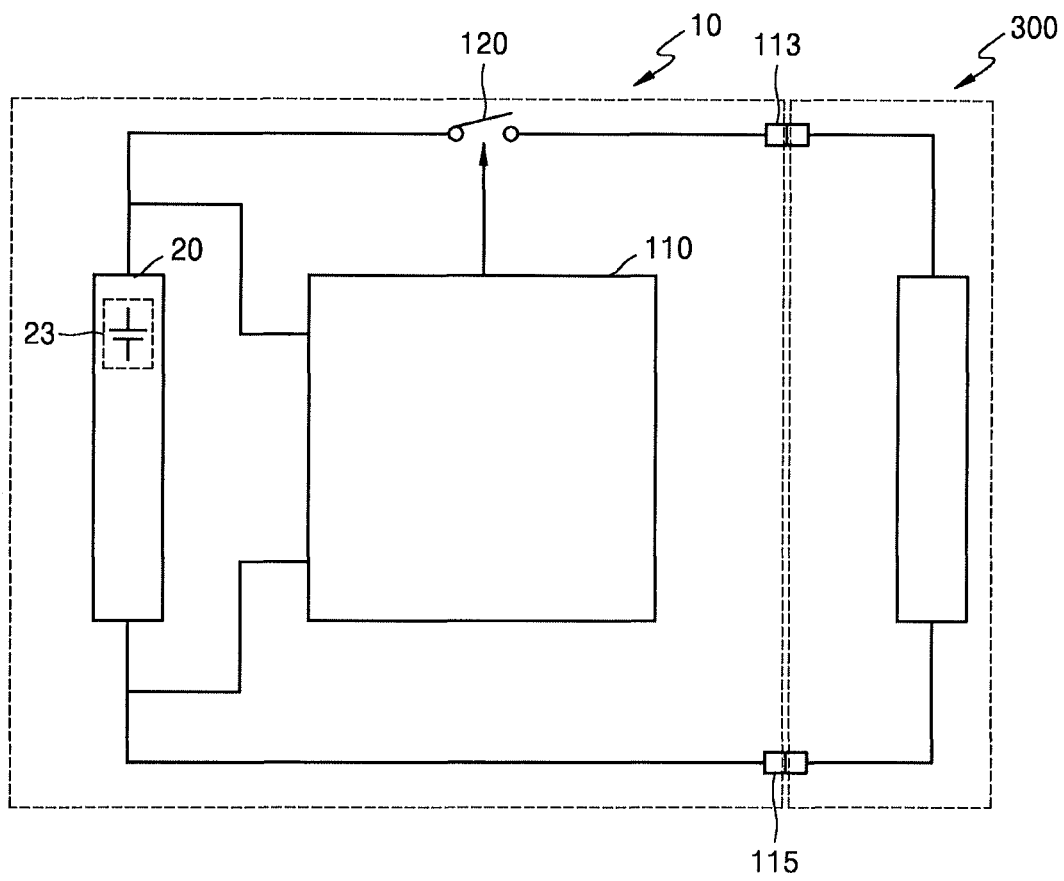
FIG. 2 briefly illustrates the internal configuration of a battery pack connected to a charger, according to an embodiment.

FIG. 2 briefly illustrates the internal configuration of a battery pack connected to a charger, according to an embodiment.

Referring to FIG. 2, a battery pack 10 may include a battery 20, a battery manager 110, a cut-off switch 120, a first pack terminal 113, and a second pack terminal 115. The battery 20, the cut-off switch 120, the first pack terminal 113, and the second pack terminal 115 are substantially the same as the battery 20, the cut-off switch 120, the first pack terminal 113, and the second pack terminal 115 of FIG. 1, and thus redundant descriptions thereof will be omitted for conciseness.

A charger 300 may convert external power into a constant current and a constant voltage and output the constant current and the constant voltage. The charger 300 may output a constant current or output a constant voltage. The charger 300 may supply a constant current and a constant voltage to the battery pack 10 through the first pack terminal 113 and the second pack terminal 115. The charger 300 may measure the voltage of the first pack terminal 113 and the second pack terminal 115 and stop charging when the measured voltage reaches a certain voltage value. The certain voltage value may be set to a full-charge voltage level of the battery 20 to be charged by being connected to the charger 300. Also, the charger 300 may stop the charging of the battery 20 through information provided by the battery manager 110. Meanwhile, the charger 300 may include a dedicated charger 300 manufactured to charge the battery 20 and another dedicated charger manufactured to charge another battery.

As described with reference to FIG. 1, the battery pack 10 may include only one cut-off switch 120 without charge and discharge paths separately formed therein. In the battery pack 10, the charging of the battery 20 may be controlled according to whether the charging of the charger 300 is terminated. The battery pack 10 may stop the charging in a particular situation according to the charge mode by using the cut-off switch 120, which will be described below.

According to an embodiment, the battery manager 110 may set the charge mode according to a user's input. The battery manager 110 may operate in any one of a first charge mode and a second charge mode. The battery manager 110 may terminate the charging of the battery 20 differently according to the first charge mode or the second charge mode when the battery 20 is fully charged. In the first charge mode, the battery manager 110 may control the cut-off switch 120 to complete the charging, in distinction from turning off the cut-off switch 120 to protect the battery 20 when the battery pack 10 is exposed to an abnormal state. In the second charge mode, the battery manager 110 may notify the charge completion to the charger 300 and the charger 300 may stop the charging.

Particularly, in the second charge mode, the battery manager 110 may control the cut-off switch 120 to protect the battery 20. Herein, the battery manager 110 may notify the full-charge information to the charger 300 to complete the charging of the battery 20, or the charger 300 may determine the charge completion time by measuring the voltage between the first pack terminal 113 and the second pack terminal 115. That is, the battery manager 110 may not turn off the cut-off switch 120 to complete the charging, and may turn off the cut-off switch 120 to protect the battery 20 in an abnormal state such as overdischarge, overcharge, overcurrent, or high temperature of the battery 20 (e.g., a short circuit in a load or the charger 300 connected to the battery pack 10, a short circuit in the battery pack 10, an exposure to a high-temperature environment, or a failure in the charger 300), as described with reference to FIG. 1. When the battery pack 10 is exposed to the abnormal state and thus the battery manager 110 turns off the cut-off switch 120, the charging/discharging of the battery pack 10 may be stopped. The battery pack 10 may be exposed to an abnormal state when a short circuit or the like occurs inside or outside the battery pack 10, and the battery pack 10 may be safely used by turning on the cut-off switch 120 after the abnormal state is repaired through inspection. Thus, until completion of the inspection, the cut-off switch 120 may maintain the turned off state and the discharging/charging of the battery 20 may be blocked.

In the first charge mode, when the battery 20 is exposed to an abnormal state, the battery manager 110 may turn off the cut-off switch 120 to protect the battery 20 or may turn off the cut-off switch 120 to complete the charging of the battery 20. That is, unlike in the second charge mode, the battery manager 110 may stop the charging of the battery 20 by detecting the voltage of the battery 20 even when the charger 300 does not stop the charging of the battery 20.

For example, it may be connected to a charger (hereinafter, referred to as another dedicated charger) that stops charging at a voltage higher than a full-charge voltage of the battery 20. When the battery 20 is charged by the other dedicated charger, the battery 20 may be damaged by overcharging. The first charge mode may prevent the battery 20 from being overcharged even when connected to the other dedicated charger. In the first charge mode, the battery manager 110 may stop the charging of the battery 20 by turning off the cut-off switch 120 even when the other dedicated charger does not stop the charging. In the first charge mode, the battery manager 110 may turn off the cut-off switch 120 to control the charging of the battery 20, in distinction from the case where the cut-off switch 120 is turned off as a protection operation when the battery pack 10 is exposed to an abnormal state. In this case, the battery manager 110 may monitor the voltage between the first pack terminal 113 and the second pack terminal 115 to determine whether there is no risk that the battery pack 10 will be overcharged by the other dedicated charger.

Thus, the battery manager 110 may determine whether the connected charger is the dedicated charger or the other dedicated charger and adjust a turn-off voltage level of the cut-off switch 120 when the connected charger is the other dedicated charger. For example, the battery manager 110 may determine the type of the charger by a separate input signal or may determine the type of the charger based on a pack voltage that is the voltage between the first and second pack terminals 113 and 115. When the charger is determined as the other dedicated charger according to the input signal or the pack voltage, the battery manager 110 may turn off the cut-off switch 120 when the pack voltage is a first reference voltage. The first reference voltage may be set to a full-charge voltage of the battery. When the charger is determined as the dedicated charger based on the input signal or the pack voltage, the battery manager 110 may turn off the cut-off switch 120 when the pack voltage is a first overvoltage. The first overvoltage may be set to an overcharge voltage that is higher than the first reference voltage and may cause damage to the battery.

According to another embodiment, in view of the cost and simplification of the replacement of a battery (20) system, only the battery pack 10 may be replaced while maintaining the other dedicated charger (or another dedicated charge system). Since the battery pack 10 uses a different communication method than the other dedicated charger, it may be difficult to stop the charging of the battery 20 by transmitting the full-charge information to the other dedicated charger. In this case, the battery manager 110 may be set to operate in the first charge mode to prevent the battery 20 from being overcharged and to monitor the voltage between the first pack terminal 113 and the second pack terminal 115 to determine whether there is no risk that the battery 20 will be overcharged.

According to another embodiment, the battery manager 110 may be set to the second charge mode when connected to the dedicated charger 300. The battery pack 10 may include only one cut-off switch 120, and the battery manager 110 may turn off the cut-off switch 120 to protect the battery 20 when the battery pack 10 is exposed to the abnormal state. The charge control of the battery 20 may be performed through the dedicated charger 300. Particularly, the dedicated charger 300 may stop the charging when the voltage of the battery 20 reaches the full-charge voltage of the battery 20 in the full-charge state or when the battery manager 110 notifies the full-charge information thereto. In the second charge mode, the battery manager 110 may monitor the voltage of the battery 20 and transmit, when the voltage of the battery 20 reaches the full-charge voltage of the battery 20, the reach information to the dedicated charger 300.

According to another embodiment, the battery pack 10 may further include a communicator. The dedicated charger 300 may also include a communicator corresponding to the communicator of the battery pack 10 to communicate information with the communicator of the battery pack 10. The communicator of the battery pack 10 may be electrically connected to a communicator of the charger 300 through a connection terminal. The communicator may be a communication interface circuit configured to communicate information through the connection terminal. In the second charge mode, the battery manager 110 may monitor the voltage of the battery 20 and transmit the full-charge information of the battery 20 through the communicator when the battery 20 is determined to be in the full-charge state. The dedicated charger 300 may stop the charging when receiving the full-charge information of the battery 20.

In this case, the battery manager 110 may determine whether the charger is the dedicated charger 300 by determining whether the communicator and the charger are electrically connected to each other. When no electrical connection is detected between the communicator and the charger, the battery manager may determine that the charger is not the dedicated charger and enter the first charge mode. On the other hand, when an electrical connection is detected between the communicator and the charger, the battery manager 100 may determine that the charger is the dedicated charger 300 and enter the second charge mode.

Figure 3:
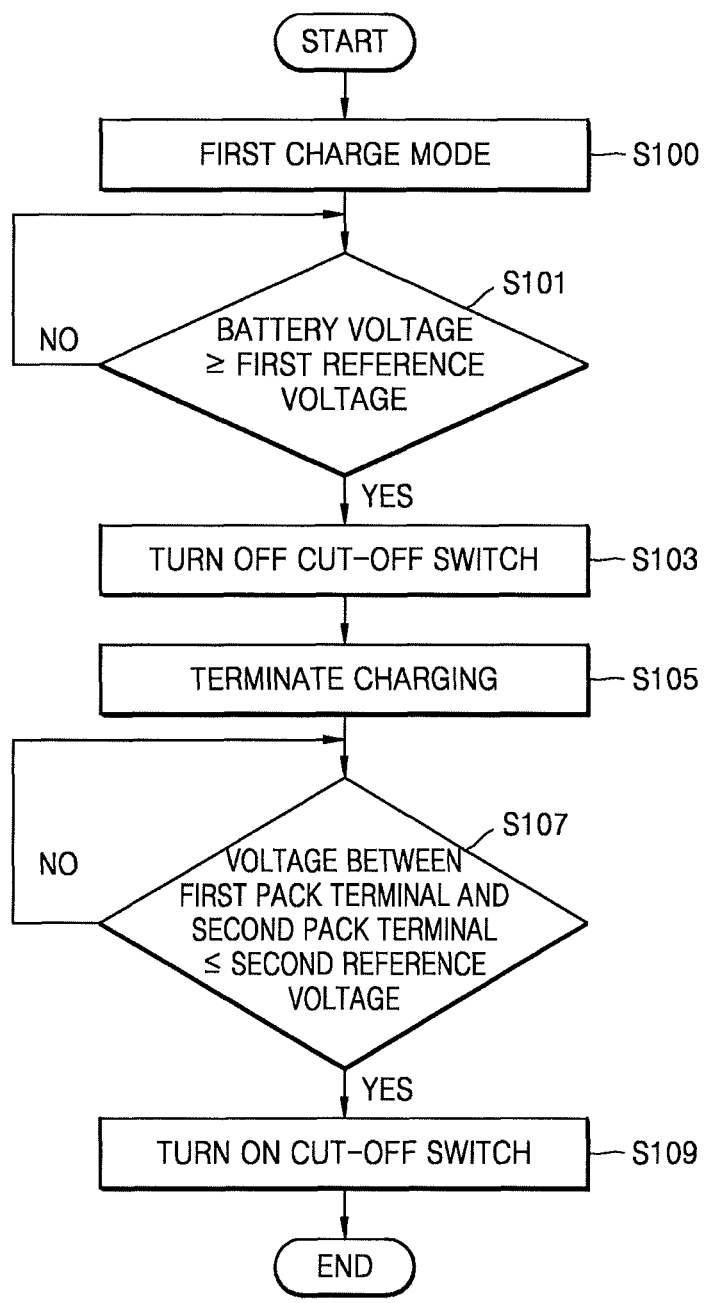
FIG. 3 is a flowchart illustrating an operation of a battery manager in a first charge mode.
Figure 4:
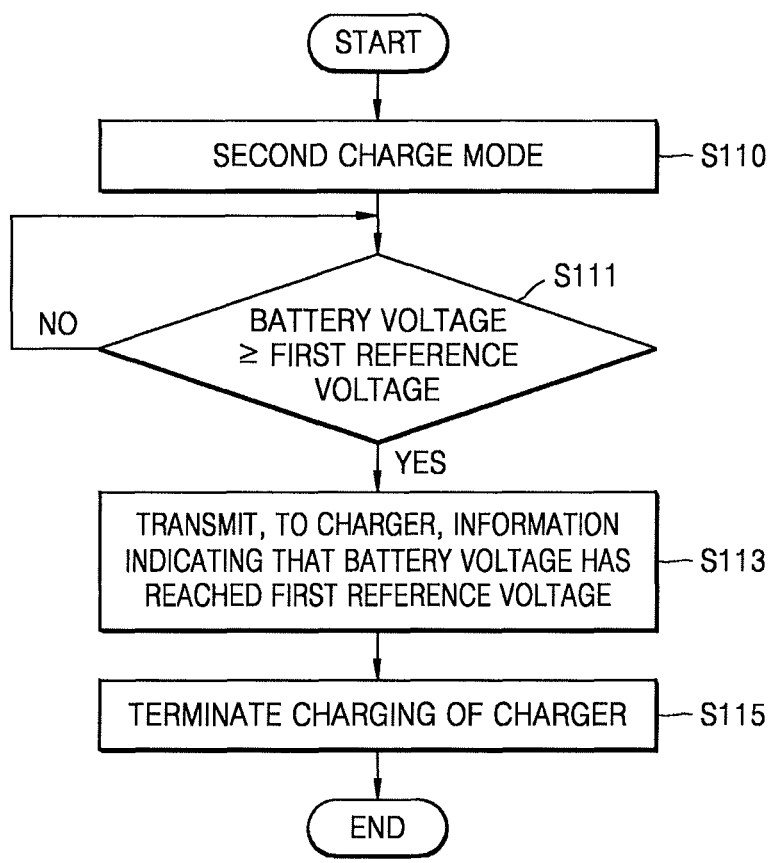
FIG. 4 is a flowchart illustrating an operation of a battery manager in a second charge mode.

FIG. 3 is a flowchart illustrating an operation of a battery manager in a first charge mode, and FIG. 4 is a flowchart illustrating an operation of a battery manager in a second charge mode.

According to an example embodiment illustrated in FIG. 3, in operation S100, the battery manager 110 may be set to the first charge mode. The user may set the charge mode of the battery manager 110 to the first charge mode. The battery manager 110 may monitor the voltage of the battery 20.

In operation S101, the battery manager 110 may determine whether the voltage of the battery 20 reaches a first reference voltage. The first reference voltage may be set to a voltage level capable of stably completing the charging of the battery 20, for example, a full-charge voltage level of the battery 20 in a full-charge state.

In operation S103, when the voltage of the battery 20 reaches the first reference voltage, the battery manager 110 may apply a control signal to the cut-off switch 120 to turn off the cut-off switch 120. In operation S105, when the cut-off switch 120 is turned off, the charge current may be blocked and thus the charging of the battery 20 may be stopped.

In operation S107, the battery manager 110 may determine the turn-on time of the cut-off switch 120 based on a change in the voltage of both terminals of the charger 300. The battery manager 110 may monitor the voltage between the first pack terminal 113 and the second pack terminal 115. The voltage of the charger 300 may be applied between the first pack terminal 113 and the second pack terminal 115 while the cut-off switch 120 is turned off. The battery manager 110 may monitor whether the voltage applied between the first pack terminal 113 and the second pack terminal 115 is lower than or equal to a second reference voltage. The second reference voltage may have a lower value than the first reference voltage and may have a voltage value when the charger 300 is disconnected from the battery pack 10 or when the charger 300 stops the charging. For example, the second reference voltage may have a value of about 0 V.

In operation S109, the battery manager 110 may turn on the cut-off switch 120 when the voltage between the first pack terminal 113 and the second pack terminal 115 is lower than or equal to the second reference voltage. When the cut-off switch 120 is turned on, the battery 20 may be discharged.

Meanwhile, in the first charge mode, the battery manager 110 may turn off the cut-off switch 120 to control the charging of the battery 20, in distinction from the case where the cut-off switch 120 is turned off as a protection operation when the battery pack 10 is exposed to an abnormal state. The battery manager 110 may have only to monitor whether the charger 300 is disconnected by monitoring the voltage between the first pack terminal 113 and the second pack terminal 115. Even when the battery manager 110 turns on the cut-off switch 120 when the charger 300 is determined to be disconnected, there is no risk that the battery 20 will be damaged.

According to another embodiment, in operation S107, the battery manager 110 may monitor the voltage between both ends of the cut-off switch 120. When the cut-off switch 120 is turned off, the battery manager 110 may monitor the voltage between both ends of the cut-off switch 120 and determine, as a result of the monitoring, whether the voltage applied to the cut-off switch 120 is lower than or equal to the second reference voltage. In operation S109, the battery manager 110 may turn on the cut-off switch 120 when the voltage of the battery 20 is lower than or equal to the second reference voltage.

According to an example embodiment illustrated in FIG. 4, in operation S110, the battery manager 110 may be set to the second charge mode. The battery manager 110 may monitor the voltage of the battery 20.

In operation S111, the battery manager 110 may determine whether the voltage of the battery 20 reaches the first reference voltage. In operation S113, when the voltage of the battery 20 reaches the first reference voltage, the battery manager 110 may transmit information indicating that the voltage of the battery 20 has reached the first reference voltage, to the charger 300 by using the communicator described with reference to FIG. 2.

In operation S115, the charger 300 may stop the charging of the battery 20 based on the information transmitted by the battery manager 110.

Figure 5:
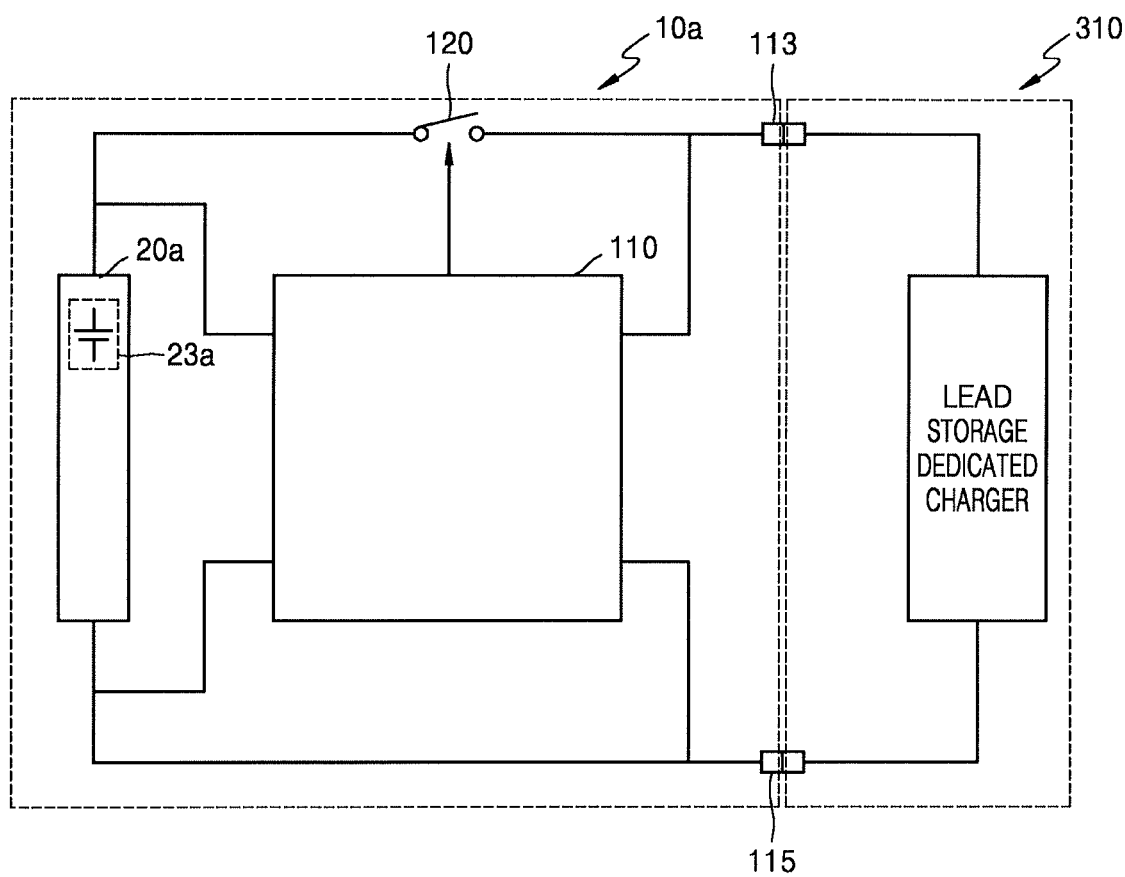
FIG. 5 schematically illustrates the internal configuration of a battery pack connected to a lead storage dedicated charger, according to another embodiment.

FIG. 5 schematically illustrates the internal configuration of a battery pack connected to a lead storage dedicated charger, according to another embodiment.

Referring to FIG. 5, a battery pack 10a may include a battery 20, a battery manager 110, a cut-off switch 120, a first pack terminal 113, and a second pack terminal 115. The battery manager 110, the cut-off switch 120, the first pack terminal 113, and the second pack terminal 115 are substantially the same as the battery manager 110, the cut-off switch 120, the first pack terminal 113, and the second pack terminal 115 of FIG. 1, and thus redundant descriptions thereof will be omitted for conciseness.

The battery pack 10a may be connected to a lead storage dedicated charger 310 for charging a lead storage battery 20a.

The lead storage battery 20a may be a rechargeable secondary battery. The lead storage battery 20a may include lead as a negative electrode and lead dioxide as a positive electrode and may use sulfuric acid as an electrolyte. The lead storage battery 20a may be charged by maintaining a constant voltage while limiting a current. The lead storage battery 20a may have no risk of being overcharged and exploded. The lead storage battery 20a may be used to supply a large amount of power to a motor such as an automobile that requires a high output.

The lead storage dedicated charger 310 may monitor the voltage of the lead storage battery 20a to determine whether to stop the charging. Particularly, the lead storage dedicated charger 310 may stop the charging when the voltage of the lead storage battery 20a reaches a preset voltage. The lead storage dedicated charger 310 may stop the charging when the voltage level of the lead storage battery 20a reaches a preset voltage level. The preset voltage level may be set to a full-charge voltage value of the lead storage battery 20a when the lead storage battery 20a connected to the lead storage dedicated charger 310 is fully charged.

Meanwhile, the lead storage battery 20a may be advantageous in that it is a safe secondary battery that is inexpensive and has no risk of explosion. However, the lead storage battery 20a may be disadvantageous in that it may store only small electric energy, may output only small electric power, has an output voltage dropped when used for a long time, and restores the output voltage only after a certain time. The lead storage battery 20a may store smaller electric energy per unit volume than a lithium battery 20a. The lead storage battery 20a may have a significantly larger volume and weight than the lithium battery 20a in order to store electric energy corresponding to the electric energy stored by the lithium battery 20a. In this regard, the lead storage battery 20a of the related art is actively substituted/replaced with the lithium battery 20a. Particularly, as a battery of an automobile requiring a high output, the lead storage battery 20a is actively substituted/replaced with the lithium battery 20a.

A lead storage battery having a rated voltage corresponding to a rated voltage of the lithium battery 20a may have a full-charge voltage higher than a full-charge voltage of the lithium battery 20a. The lead storage dedicated charger 310 may stop the charging based on the full-charge voltage of the lead storage battery 20a. When the lithium battery 20a of the battery pack 10a is charged by using the lead storage dedicated charger 310, the lead storage dedicated charger 310 may perform the charging to a full-charge voltage reference of the lead storage battery 20a without stopping the charging even when the lithium battery 20a of the battery pack 10a is fully charged. For example, a 48 V lead storage battery 20a may have a full-charge voltage of 62 V when fully charged, and a 48 V lithium battery 20a may have a full-charge voltage of 56 V when fully charged. Since the lead storage dedicated charger 310 for charging the lead storage battery 20a stops the charging based on the full-charge voltage of the lead storage battery 20a, it may continue the charging until the voltage of the lithium battery 20a connected to the lead storage dedicated charger 310 reaches 62 V. The lead storage dedicated charger 310 may not stop the charging of the battery pack 10a even when the voltage of the lithium battery 20a of the battery pack 10a reaches 56 V when the battery pack 10a is charged. In this case, when the charging of the lead storage dedicated charger 310 is not stopped, the battery pack 10a may be overcharged and thus the lithium battery 20a of the battery pack 10a may be damaged or exploded.

According to an embodiment, the battery manager 110 may be set to the first charge mode when connected to the lead storage dedicated charger 310. Referring to FIG. 1, the battery 20 according to an embodiment may include lithium. Hereinafter, a battery 20a is assumed to be a secondary battery including lithium. Since the battery manager 110 may be set to the first charge mode when connected to the lead storage dedicated charger 310, the battery manager 11 may stop the charging of the battery 20a by turning off the cut-off switch 120 even when the lead storage dedicated charger 310 does not stop the charging. The battery manager 110 may turn off the cut-off switch 120 when the voltage of the battery 20a reaches the first reference voltage described with reference to FIG. 2. The battery manager 110 may monitor the voltage between the first pack terminal 113 and the second pack terminal 115 to determine that an overcharge factor caused by the lead storage dedicated charger 310 is eliminated. The battery manager 110 may turn on the cut-off switch 120 when the overcharge factor is eliminated. For example, a full-charge voltage of a 48 V lead storage battery 20a may be 62 V, and a full-charge voltage of a 48 V battery 20a may be 56 V. Since the battery manager 110 is set to the first charge mode, the battery manager 110 may turn off the cut-off switch 120 when the voltage of the battery 20 reaches a voltage of 56 V.

Figure 6:
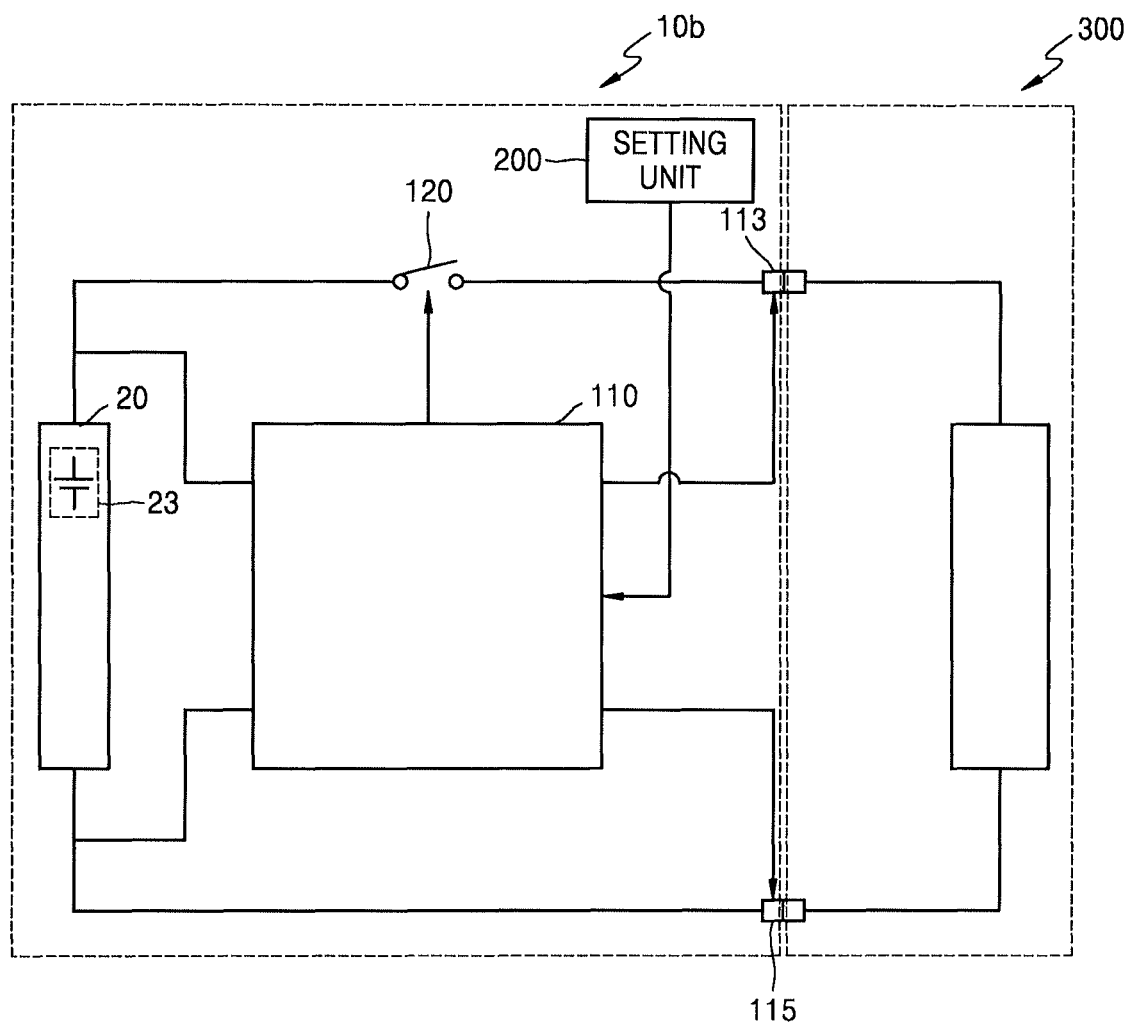
FIG. 6 schematically illustrates the internal configuration of a battery pack according to another embodiment.

FIG. 6 schematically illustrates the internal configuration of a battery pack according to another embodiment.

Referring to FIG. 6, a battery pack 10b may include a battery 20, a battery manager 110, a cut-off switch 120, and a setting unit 200. The battery 20, the battery manager 110, the cut-off switch 120, the first pack terminal 113, and the second pack terminal 115 are substantially the same as the battery 20, the battery manager 110, the cut-off switch 120, the first pack terminal 113, and the second pack terminal 115 of FIG. 12, and thus redundant descriptions thereof will be omitted for conciseness.

The setting unit 200 may output several mode signals according to the voltage level to the battery manager 110. The setting unit 200 may include an on/off switch, a push switch, a rotary switch, a locus switch, a slide switch, or the like. However, the setting unit 200 is not limited thereto and may include any switch that may output several mode signals.

According to an embodiment, the setting unit 200 may output a first level signal and a second level signal. This may be the input signal described with reference to FIG. 2 and may be a signal for determining the type of charger connected to the battery manager 110. Meanwhile, the first level signal may be of a high level and the second level signal may be of a low level; however, the present disclosure is not limited thereto. The setting unit 200 may apply the first level signal and the second level signal to the battery manager 110. The battery manager 110 may receive the first level signal to be set to a first charge mode. The battery manager 110 may receive the second level signal to be set to a second charge mode. For example, the setting unit 200 may include a slide switch. When the slide switch is turned on, the first level signal may be applied to the battery manager 110 to allow the battery manager 110 to charge the battery 20 in the first charge mode. When the slide switch is turned off, the second level signal may be applied to the battery manager 110 to allow the battery manager 110 to charge the battery 20 in the second charge mode.

According to an embodiment, the setting unit 200 may be arranged at an outside of the battery pack 10b to receive a user's input. The user may operate the setting unit 200 according to the characteristics of the charger 300 connected to the battery pack 10b. The setting unit 200 may output the first level signal or the second level signal to the battery manager 110 according to the user's operation to set the charge mode of the battery manager 110. For example, when the battery pack 10b is connected to the lead storage dedicated charger 310, the user may operate the setting unit 200 to output the first level signal. The setting unit 200 may apply the first level signal to the battery manager 110. The battery manager 110 may receive the first level signal to be set to the first charge mode. The battery manager 110 may monitor the voltage of the battery 20 to determine whether it reaches the first reference voltage described with reference to FIG. 2. When the voltage of the battery 20 reaches the first reference voltage, the battery manager 110 may turn off the cut-off switch 120 to block the charge current of the charger 300 and may measure the voltage between the first pack terminal 113 and the second pack terminals 115. When the voltage between the first pack terminal 113 and the second pack terminal 115 is lower than or equal to the second reference voltage described with reference to FIG. 3, the battery manager 110 may turn on the cut-off switch 120 to discharge the battery 20.

On the other hand, when the battery pack 10b is connected to the dedicated charger 300 capable of stably charging the battery 20 of the battery pack 10b, the user may operate the setting unit 200 to output the second level signal. The battery manager 110 may receive the second level signal to enter the second charge mode. The battery manager 110 may not turn off the cut-off switch 120 even when the voltage of the battery 20 reaches the first reference voltage. When the voltage of the battery 20 reaches the first reference voltage, the battery manager 110 may notify the dedicated charger 300 that the voltage of the battery 20 has reached the first reference voltage.

According to another embodiment, the battery manager 110 may correct the level of the first reference voltage according to the degradation degree of the battery 20. The battery manager 110 may calculate the degradation degree of the battery 20 by obtaining the current/voltage information of the battery 20. The battery 20 may be degraded by the use time and the use environment, and the charge amount or the output voltage of the degraded battery 20 may change. Also, the full-charge voltage of the battery 20 may change with the degradation thereof, and the voltage thereof may rise or fall according to the characteristics of the internal configuration of the battery 20. The battery manager 110 may set a suitable value of the first reference voltage according to the degradation degree of the battery 20. The battery manager 110 may estimate the degradation degree of the battery 20 by cumulatively calculating the charge/discharge capacity or the charge/discharge cycle count of the battery 20. The battery manager 110 may increase or decrease the first reference voltage value according to the degradation degree by considering the characteristics of the battery 20.

The present disclosure has been particularly shown and described with reference to example embodiments thereof. However, those of ordinary skill in the art will understand that various changes in form and details may be made therein without departing from the spirit and scope of the present disclosure as defined by the following claims. Therefore, the described embodiments should be considered in descriptive sense only and not for purposes of limitation. Thus, the scope of the present disclosure may be defined not by the above detailed descriptions but by the following claims, and all differences within the scope will be construed as being included in the present disclosure.

The invention claimed is:

1. A battery pack, comprising:
a battery including a plurality of battery cells;
a first pack terminal and a second pack terminal, each disposed to be connected to a charger;
a cut-off switch arranged on a path through which charge and discharge currents of the battery flow; and
a battery manager configured to monitor a state of the battery and to turn off the cut-off switch when there is a risk of the battery being damaged, and configured to determine whether the charger is a dedicated charger,
wherein:
the battery manager is configured to operate in a first charge mode when it is determined that the charger is not the dedicated charger,
the battery manager is configured to operate in a second charge mode, different from the first charge mode, when it is determined that the charger is the dedicated charger,
the battery manager is configured to, in the first charge mode and the second charge mode, initially permit charging of the battery with the cut-off switch in a turn-on state,
in the first charge mode, the cut-off switch is in a turned-off state when a pack voltage that is a voltage between the first pack terminal and the second pack terminal is greater than or equal to a first reference voltage,
in the second charge mode, the cut-off switch remains in the turn-on state when the voltage between the first pack terminal and the second pack terminal is greater than or equal to the first reference voltage, and
in the second charge mode, when the voltage between the first pack terminal and the second pack terminal reaches the first reference voltage, the battery manager transmits information to the charger to notify the charger to complete charging of the battery.

2. The battery pack of claim 1, further comprising a setting unit that is configured to output a signal by which the battery manager determines whether the charger is the dedicated charger or is different from the dedicated charger.

3. The battery pack of claim 2, wherein the setting unit is configured to a first signal and a second signal to the battery manager,
when receiving the first signal, the battery manager is configured to determine that the charger is different from the dedicated charger, and
when receiving the second signal, the battery manager is configured to determine that the charger is to the dedicated charger.

4. The battery pack of claim 1, further comprising a communicator in the battery pack, the communicator in the battery pack being is configured to be electrically connected to the charger and to transmit the state of the battery to the charger,
   wherein the battery manager is configured to determine that the charger is different from the dedicated charger when the communicator in the battery pack is not electrically connected to the charger.

5. The battery pack of claim 1, wherein the battery manager is configured to, in the first charge mode: monitor the voltage between the first pack terminal and the second pack terminal while the cut-off switch is turned off, and
   turn on the cut-off switch when the voltage between the first pack terminal and the second pack terminal is lower than or equal to a second reference voltage that is lower than the first reference voltage.

6. The battery pack of claim 1, wherein the battery manager is configured to estimate a degradation degree of the battery according to a charge count of the battery and to change a level of the first reference voltage according to the degradation degree.

7. The battery pack of claim 1, wherein the cut-off switch comprises a relay.

* * * * *